(12) United States Patent
Kawagoe et al.

(10) Patent No.: US 6,771,049 B2
(45) Date of Patent: Aug. 3, 2004

(54) SECONDARY BATTERY PROTECTION CIRCUIT HAVING A CLAMPING CIRCUIT INCLUDING A COMPARATOR AND A TRANSISTOR

(75) Inventors: Osamu Kawagoe, Atsugi (JP); Yukihiro Terada, Atsugi (JP)

(73) Assignee: Mitsumi Electric Co., Ltd., Tama (JP)

( * ) Notice: Subject to any disclaimer, the term of this patent is extended or adjusted under 35 U.S.C. 154(b) by 0 days.

(21) Appl. No.: 10/304,368

(22) Filed: Nov. 26, 2002

(65) Prior Publication Data

US 2003/0146738 A1 Aug. 7, 2003

(30) Foreign Application Priority Data

Feb. 1, 2002 (JP) ........................................ 2002/025006

(51) Int. Cl.[7] ............................................. H01M 10/46
(52) U.S. Cl. ....................................................... 320/136
(58) Field of Search ............................... 320/127, 128, 320/134, 136

(56) References Cited

U.S. PATENT DOCUMENTS

| | | | | |
|---|---|---|---|---|
| 5,909,103 A | * | 6/1999 | Williams | 320/134 |
| 6,285,165 B1 | * | 9/2001 | Terada | 320/134 |
| 6,331,763 B1 | * | 12/2001 | Thomas et al. | 320/136 |
| 6,392,387 B1 | * | 5/2002 | Sage et al. | 320/136 |

FOREIGN PATENT DOCUMENTS

JP 2872365 B2 1/1999

* cited by examiner

*Primary Examiner*—Edward H. Tso
(74) *Attorney, Agent, or Firm*—Frishauf, Holtz, Goodman & Chick, P.C.

(57) ABSTRACT

In a secondary battery protection circuit (200) for protecting a secondary battery (300) by controlling, by turning a discharge control switch (FET1) on and off, a discharging current (I) flowing from the secondary battery (300) through a load (400) connected between a pair of external connection terminals (101, 102), a clamping circuit (210) clamps a control terminal (G1) of the discharge control switch (FET1) into a ground potential when the external connection terminals (101, 102) are short-circuited.

5 Claims, 6 Drawing Sheets

SECONDARY BATTERY PROTECTION CIRCUIT HAVING A CLAMPING CIRCUIT INCLUDING A COMPARATOR AND A TRANSISTOR

BACKGROUND OF THE INVENTION

This invention relates to a secondary battery protection circuit for use in a battery unit comprising at least one chargeable electric cell (secondary battery) such as a lithium ion cell and, in particular, to measures in a case where it is impossible to operate the secondary battery protection such as on short-circuiting of outputs thereof.

Among various types of chargeable electric cells, a lithium ion cell is particularly weak against overdischarge or overcharge. In this connection, it is essential to provide a secondary battery protection circuit for detecting an overdischarge condition and an overcharge condition to protect a secondary battery from the overdischarge condition and the overcharge condition. For this purpose, the secondary battery protection circuit comprises an overdischarge prevention mechanism and an overcharge prevention mechanism. In addition, the secondary battery protection circuit may detect an overcurrent condition during discharge of the secondary battery to protect the secondary cell from the overcurrent condition. In this event, the secondary battery protection circuit may comprise an overcurrent prevention mechanism as well as the overdischarge prevention mechanism and the overcharge prevention mechanism. However, description will be hereinuder directed to the secondary battery protection circuit comprising the overdischarge prevention mechanism and the overcharge prevention mechanism.

Such a secondary battery protection circuit is disclosed, for example, in Japanese Granted Patent Publication of No. 2,872,365 or JP-B 2872365 (which will later be called "prior art reference") under the title of "CHARGEABLE POWER UNIT." According to JP-B 2872365, the secondary battery protection circuit comprises a secondary battery, a discharge control switch, and a charge control switch. The discharge control switch and the charge control switch comprise first and second MOSFETs containing first and second parasitic diodes, respectively. The first parasitic diode is connected to the first MOSFET so that a forward direction of the first parasitic diode coincides with a charging direction of the secondary battery. The second parasitic diode is connected to the second MOSFET so that a forward direction of the second parasitic diode coincides with a discharging direction of the secondary battery.

However, in the manner which will later be described in conjunction with FIGS. 1 through 3 in detail, it is feared that the following problem occur in the above-mentioned prior art reference. That is, it is impossible to operate the secondary battery protection circuit on short-circuiting of outputs thereof.

SUMMARY OF THE INVENTION

It is therefore an object of the present invention to provide a secondary battery protection circuit which is capable of preventing the secondary battery protection circuit from being impossible to operate on short-circuiting of outputs thereof.

Other objects of this invention will become clear as the description proceeds.

On describing the gist of an aspect of this invention, it is possible to be understood that a method is for protecting a secondary battery by controlling, by turning a discharge control switch on and off, a discharging current flowing from the secondary battery through a load connected between a pair of external connection terminals. The discharge control switch has a control terminal.

According to the aspect of this invention, the above-mentioned method comprises the step of clamping the control terminal of the discharge control switch into a ground potential when the external connection terminals are short-circuited.

On describing the gist of another aspect of this invention, it is possible to be understood that a secondary battery protection circuit is for protecting a secondary battery by controlling, by turning a discharge control switch on and off, a discharging current flowing from the secondary battery through a load connected between a pair of external connection terminals. The discharge control switch has a control terminal.

According to the other aspect of this invention, the above-understood secondary battery protection circuit comprises a clamping circuit for clamping the control terminal of the discharge control switch into a ground potential when the external connection terminals are short-circuited.

DESCRIPTION OF THE PREFERRED EMBODIMENT

Figure 1:
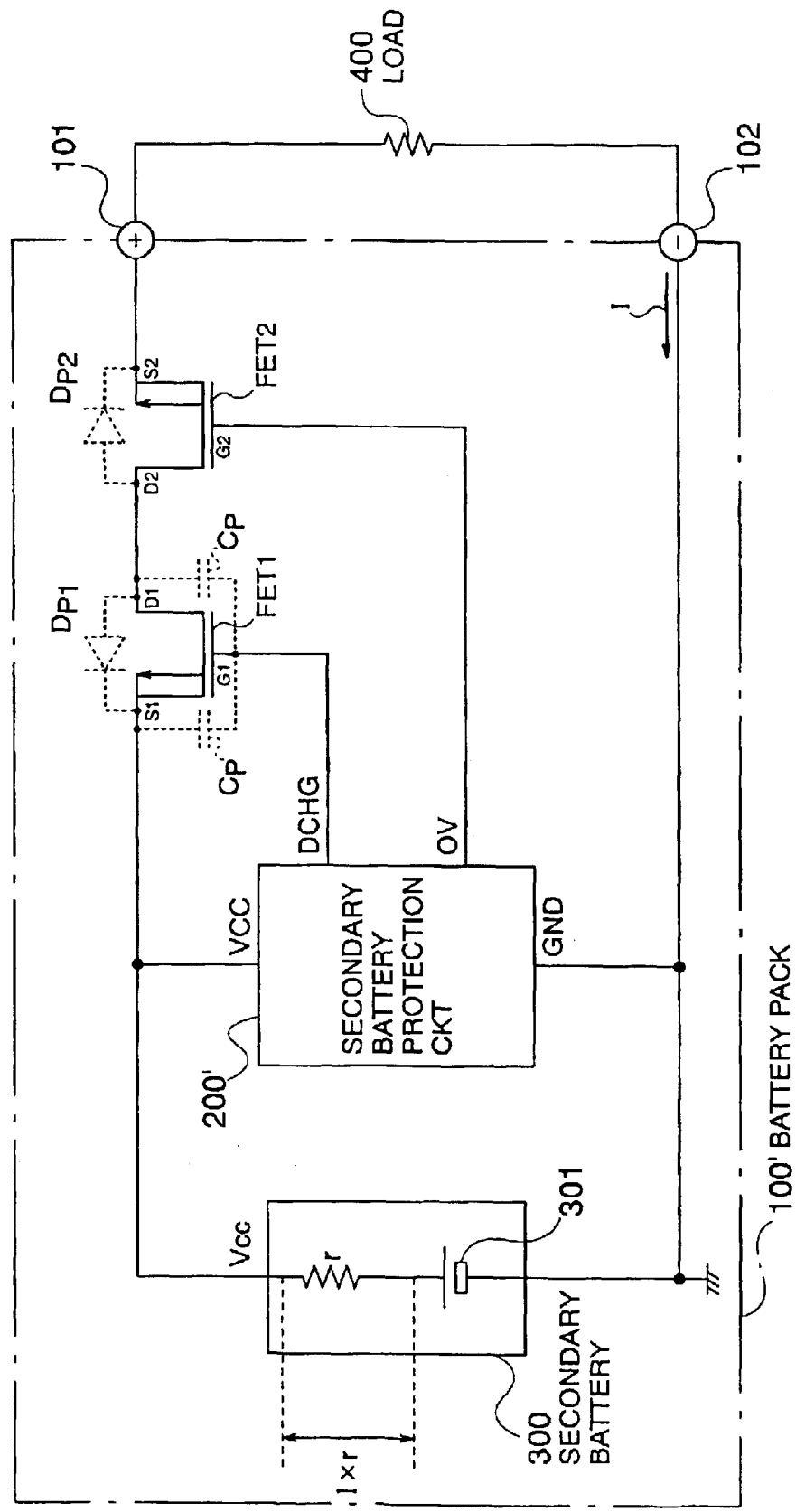
FIG. 1 is a block diagram of a conventional battery pack comprising a conventional secondary battery protection circuit.

Referring to FIG. 1, a conventional battery unit 100' comprising a conventional secondary battery protection circuit 200' will be described at first in order to facilitate an understanding of the present invention. Description will later be made about the conventional secondary battery protection circuit 200' on the basis of the above-mentioned prior art reference.

The battery unit 100' may be called a battery pack and has a positive electrode terminal 101 and a negative electrode terminal 102. The positive electrode terminal 101 and the negative electrode terminal 102 are also called external connection terminals. Between the positive electrode terminal 101 and the negative electrode terminal 102, a load 400 or a charger (not shown) are selectively connected.

The illustrated battery unit 100' comprises a secondary battery 300 including at least one lithium ion cell 301 (which is also called a unit cell). The secondary battery 300 comprises an internal impedance r. The secondary battery 300 generates a battery voltage Vcc. The secondary battery 300 is connected in parallel with the secondary battery protection circuit 200'. In other words, the secondary battery 300 has a cathode connected to a power source terminal VCC of the secondary battery protection circuit 200' and an anode connected to a ground terminal GND of the secondary battery protection circuit 200'.

In addition, the cathode of the secondary battery 300 is connected to the positive electrode terminal 101 of the battery pack 100' through first and second field effect transistors FET1 and FET2 which will later be described. The anode of the secondary battery 300 is grounded and is connected to the negative electrode terminal 102 of the battery pack 100'. In the manner which is described above, the secondary battery protection circuit 200' comprises an overdischarge prevention mechanism (not shown) and an overcharge prevention mechanism (not shown).

The overdischarge prevention mechanism of the secondary battery protection circuit 200' is set with an overdischarge detection threshold voltage Vth(od). More specifically, the overdischarge prevention mechanism compares the battery voltage Vcc with the overdischarge detection threshold voltage Vth(od) during discharge. When the battery voltage Vcc is lower than the overdischarge detection threshold voltage Vth(od), the overdischarge prevention mechanism judges that the secondary battery 300 is put into an overdischarge condition to produce an overdischarge detected signal having a logic high level from an overdischarge detection output terminal (a first gate driving terminal) DCHG. On the other hand, when the battery voltage Vcc is higher than an overdischarge return voltage (Vth(od)+Vhy(od)) obtained by adding an overdischarge hysteresis voltage Vhy(od) to the overdischarge detection threshold voltage Vth(od) during charge, the overdischarge prevention mechanism produces an overdischarge protection cancellation signal having a logic low level from the overdischarge detection output terminal DCHG.

Likewise, the overcharge prevention mechanism of the secondary battery protection circuit 200' is set with an overcharge detection threshold voltage Vth(oc). More specifically, the overcharge prevention mechanism compares the battery voltage Vcc with the overcharge detection threshold voltage Vth(oc) during charge. When the battery voltage Vcc is higher than the overcharge detection threshold voltage Vth(oc), the overcharge prevention mechanism judges that the secondary battery 300 is put into an overcharge condition to produce an overcharge detected signal having a logic high level from an overcharge detection output terminal (a second gate driving terminal) OV. On the other hand, when the battery voltage Vcc is lower than an overcharge return voltage (Vth(oc)−Vhy(oc)) obtained by subtracting an overcharge hysteresis voltage Vhy(oc) from the overcharge detection threshold voltage Vth(oc) during discharge, the overcharge prevention mechanism produces an overcharge protection cancellation signal having a logic low level from the overcharge detection output terminal OV.

In the manner which is described above, between the cathode (a plus electrode) of the secondary battery 300 (or the power source terminal VCC) and the positive electrode terminal 101, the first and the second field effect transistors FET1 and FET2 are connected in series with each other. The first field effect transistor FET1 is operable as a discharge control switch while the second field effect transistor FET2 is operable as a charge control switch.

In the example being illustrated, each of the first and the second field effect transistors FET1 and FET2 consists of a p-channel metal oxide semiconductor field effect transistor (MOSFET). The first field effect transistor FET1 has a first source S1 connected to the cathode of the secondary battery 300 (or the power source terminal VCC), a first gate G1 connected to the overdischarge detection output terminal (the first gate driving terminal) DCHG, and a first drain D1. The first gate G1 of the first field effect transistor FET1 is operable as a first control terminal of the discharge control switch. The second field effect transistor FET2 has a second source S2 connected to the positive electrode terminal 101, a second gate G2 connected to the overcharge detection output terminal (the second gate driving terminal) OV, and a second drain D2 connected to the first drain D1 of the first field effect transistor FET1. The second gate G2 of the second field effect transistor FET2 is operable as a second control terminal of the charge control switch. An arrangement of the first and the second field effect transistors FET1 and FET2 may be exchanged.

When the first gate G1 of the first field effect transistor FET1 is supplied with the overdischarge detected signal having the logic high level from the overdischarge prevention mechanism (the overdischarge detection output terminal DCHG), the first field effect transistor FET1 is turned off. On the other hand, when the first gate G1 of the first field effect transistor FET1 is supplied with the overdischarge protection cancellation signal having the logic low level from the overdischarge prevention mechanism (the overdischarge detection output terminal DCHG), the first field effect transistor FET1 is turned on. Similarly, when the second gate G2 of the second field effect transistor FET2 is supplied with the overcharge detected signal having the logic high level from the overcharge prevention mechanism (the overcharge detection output terminal OV), the second field effect transistor FET2 is turned off. When the second gate G2 of the second field effect transistor FET2 is supplied with the overcharge protection cancellation signal having the logic low level from the overcharge prevention mechanism (the overcharge detection output terminal OV), the second field effect transistor FET2 is turned on.

In the manner which is described in the above-mentioned prior art reference, the first field effect transistor FET1 has a first parasitic diode Dp1 while the second field effect transistor FET2 has a second parasitic diode Dp2. The first parasitic diode Dp1 is connected in parallel with the first field effect transistor FET1 so that a forward direction of the first parasitic diode Dp1 coincides with a charging direction of the secondary battery 300. That is, the first parasitic diode Dp1 has a first cathode connected to the first source S1 of the first field effect transistor FET1 and a first anode connected to the first drain D1 of the first field effect transistor FET1. The second parasitic diode Dp2 is connected in parallel with the second field effect transistor FET2 so that a forward direction of the second parasitic diode Dp2 coincides with a discharging direction of the secondary battery 300. That is, the second parasitic diode Dp2 has a second cathode connected to the second source S2 of the second field effect transistor FET2 and a second anode connected to the second drain D2 of the second field effect transistor FET2. In addition, each of the first and the second parasitic diodes Dp1 and Dp2 is called a body diode.

Figure 2:
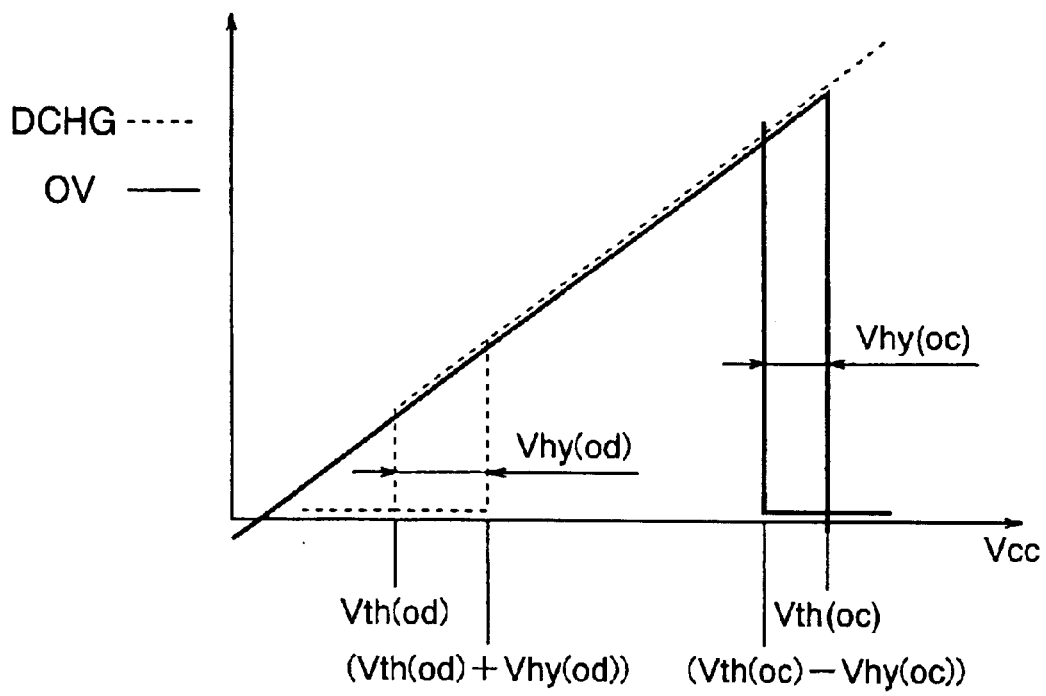
FIG. 2 is a view for use in describing operation of the secondary battery protection circuit illustrated in FIG. 1.

Referring now to FIG. 2 in addition to FIG. 1, description will be made as regards operation of the battery unit (the battery pack) 100' illustrated in FIG. 1. In FIG. 2, the abscissa represents the battery voltage Vcc and the ordinate represents a level of the overdischarge detection output terminal DCHG of the overdischarge prevention mechanism or a level of the overcharge detection output terminal OV of the overcharge prevention mechanism. In FIG. 2, a broken line represents an output characteristic of the overdischarge prevention mechanism on discharging while a solid line represents an output characteristic of the overcharge prevention mechanism on charging. An operation on discharging will be first described and an operation on charging will be successively described.

On discharging of the battery pack 100', the load 400 is connected between the positive electrode terminal 101 and the negative electrode terminal 102. While the secondary battery 300 is discharged, as shown in the broken line in FIG. 2, the battery voltage Vcc of the secondary battery 300 becomes gradually low. When the battery voltage Vcc is finally lower than the overdischarge detection threshold voltage Vth(od), the overdischarge prevention mechanism (the overdischarge detection output terminal DCHG) produces the overdischarge detected signal having the logic high level. Responsive to the overdischarge detected signal, the first field effect transistor FET1 is turned off and thereby the overdischarge is prevented.

When an effect that the secondary battery 300 is put into an overdischarge condition is notified to a user by any notification arrangement, the user removes the load 400 from the external connection terminals 101 and 102 and connects the charger (not shown) for the load 400 with the external connection terminals 101 and 102. Accordingly, charging of the secondary battery 300 starts. In this event, a charging current flows through the first parasitic diode Dp1 in the first field effect transistor FET1. Thereafter, when the battery voltage Vcc of the secondary battery 300 is higher than the overdischarge return voltage (Vth(od)+Vhy(od)) obtained by adding the overdischarge hysteresis voltage Vhy(od) to the overdischarge detection threshold voltage Vth(od), the overdischarge prevention mechanism (the overdischarge detection output terminal DCHG) produces the overdischarge protection cancellation signal having the logic low level. Responsive to the overdischarge protection cancellation signal, the first field effect transistor FET1 is turned on.

Now, in the manner which is described above, while charging of the secondary battery 300 is continued, the battery voltage Vcc of the secondary battery 300 becomes gradually high, as shown in the solid line in FIG. 2. When the battery voltage Vcc is finally higher than the overcharge detection threshold voltage Vth(oc), the overcharge prevention mechanism (the overcharge detection output terminal OV) produces the overcharge detected signal having the logic high level. Responsive to the overcharge detected signal, the second field effect transistor FET2 is turned off and thereby the overcharge is prevented.

When an effect that the secondary battery 300 is put into an overcharge condition is notified to a user by any notification arrangement, the user decides that the charging is completed. Thereafter, the user removes the charger from the external connection terminals 101 and 102 and connects the load 400 for the charger with the external connection terminals 101 and 102. Accordingly, discharging of the secondary battery 300 starts. In this event, a discharging current flows through the second parasitic diode Dp2 in the second field effect transistor FET2. Thereafter, when the battery voltage Vcc of the secondary battery 300 is lower than the overcharge return voltage (Vth(oc)−Vhy(oc)) obtained by subtracting the overcharge hysteresis voltage Vhy(oc) from the overcharge detection threshold voltage Vth(oc), the overcharge prevention mechanism (the overcharge detection output terminal) produces the overcharge protection cancellation signal having the logic low level. Responsive to the overcharge protection cancellation signal, the second field effect transistor FET2 is turned on.

Now, the first field effect transistor FET1 has parasitic gate capacitors Cp which are disposed between the first gate G1 and the first source S1 and between the first gate G1 and the first drain D1, as shown in FIG. 1. In addition, although the secondary battery protection circuit 200' is implemented by an integrated circuit (IC), the integrated circuit has an operating limit as shown in a broken line of FIG. 3.

Figure 3:
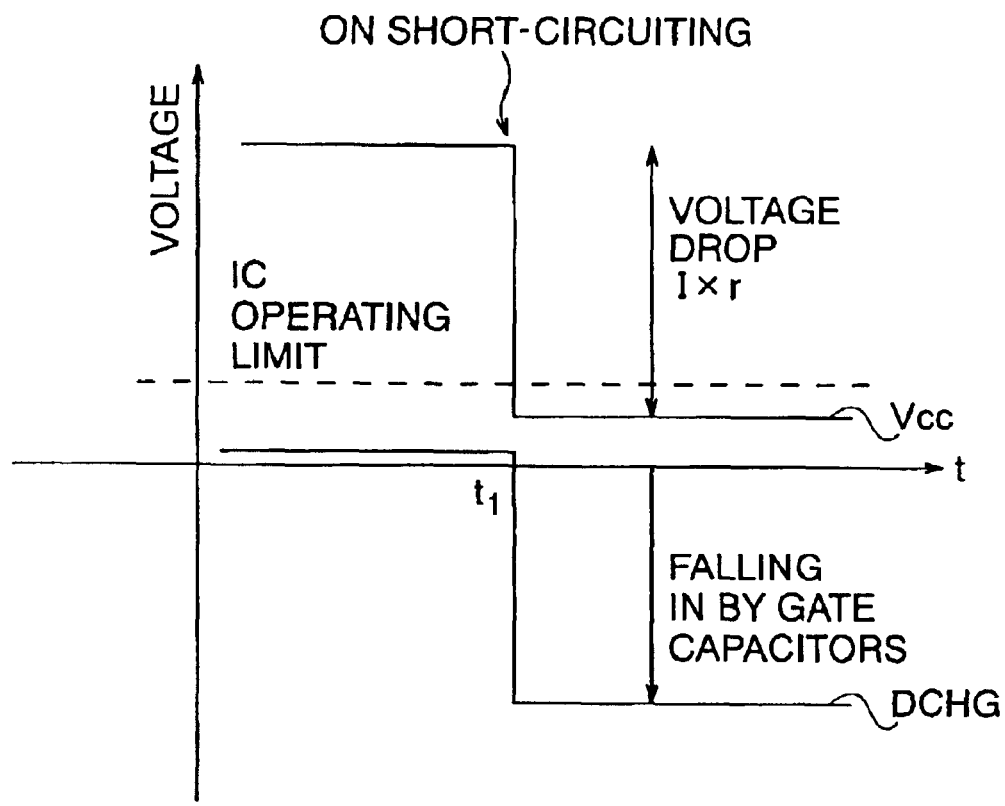
FIG. 3 is a view showing waveforms for use in describing operation of the secondary battery protection circuit illustrated in FIG. 1 on short-circuiting of outputs thereof.

It will now be assumed that the external connection terminals 101 and 102 are short-circuited by mistake during discharge at a time instant $t_1$ in FIG. 3 caused by any circumstances. In this event, a large current flows as the discharging current l. Inasmuch as the secondary battery 300 has the internal impedance r in the manner which is described above, a voltage drop of (l×r) occurs inside the secondary battery 300. As a result, the battery voltage Vcc generated by the secondary battery 300 falls in as shown in FIG. 3. When falling of the battery voltage Vcc is large, the power source voltage Vcc in the secondary battery protection circuit 200' is lower than the operating limit of the integrated circuit, as shown in FIG. 3. Accordingly, it is impossible to operate the secondary battery protection circuit 200'. Under the circumstances, caused by influence of the parasitic gate capacitors Cp in the first field effect transistor FET1, a voltage of the overdischarge detection output terminal DCHG of the secondary battery protection circuit 200' (or a gate potential of the first gate G1 of the first field effect transistor FET1) also falls in as shown in FIG. 3.

Figure 4:
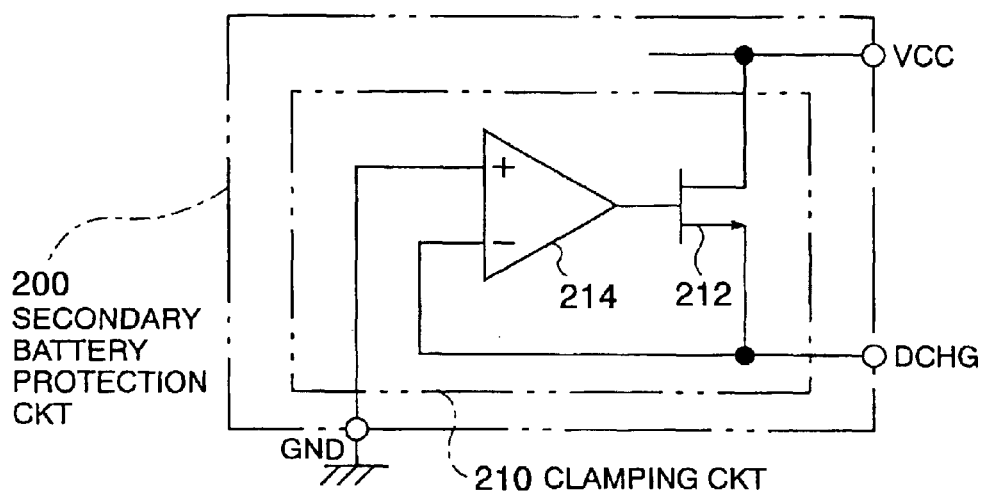
FIG. 4 is a block diagram of a main part of a secondary battery protection circuit according to a first embodiment of this invention.

Referring to FIG. 4, the description will proceed to a secondary battery protection circuit 200 according to a first embodiment of this invention. The illustrated secondary battery protection circuit 200 is similar in structure and operation to the conventional secondary battery protection circuit 200' illustrated in FIG. 1 except that the secondary battery protection circuit 200 further comprises a clamping circuit 210. Accordingly, the same reference symbols are attached to those having similar functions in those illustrated in FIG. 1 and description thereto is omitted for the purpose of simplification of the description.

The illustrated clamping circuit 210 is connected to the power source terminal VCC, the ground terminal GND, and the overdischarge detection output terminal DCHG. The clamping circuit 210 comprises an npn-type bipolar transistor 212 and a comparator 214. The npn-type bipolar transistor 212 has a collector connected to the power source terminal VCC, an emitter connected to the overdischarge detection output terminal DCHG, and a base connected to an output terminal of the comparator 214. The comparator 214 has an inverting input terminal−connected to the overdischarge detection output terminal DCHG and a noninverting input terminal+connected to the ground terminal GND.

Figure 5:
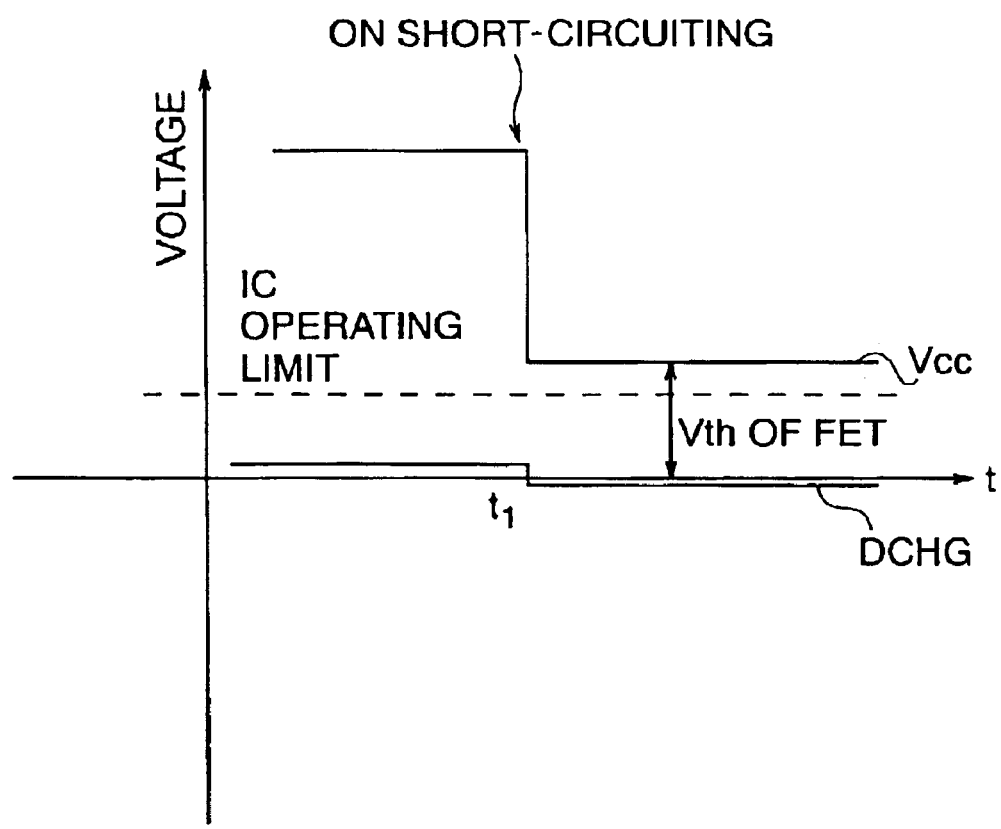
FIG. 5 is a view showing waveforms for use in describing operation of the secondary battery protection circuit illustrated in FIG. 4 on short-circuiting of outputs thereof.

Referring now to FIG. 5 in addition to FIG. 4, description will be made as regards operation of the secondary battery protection circuit 200 according to the first embodiment of this invention.

It will be assumed that the external connection terminals 101 and 102 (FIG. 1) are short-circuited by mistake during discharge at a time instant $t_1$ in FIG. 5 caused by any circumstances. In this event, a large current flows as the discharging current l.

In this event, the clamping circuit 210 clamps the first gate G1 of the first field effect transistor FET1 (FIG. 1) into a ground potential. As a result, it is possible to prevent a gate potential of the first field effect transistor FET1 from falling in less than the ground potential. Inasmuch as the gate potential of the first field effect transistor FET1 is clamped to the ground potential in the manner which is described above, it is possible to limit falling of a voltage (the battery voltage Vcc) in the power source terminal VCC of the secondary battery protection circuit 200 up to a threshold voltage Vth of the first field effect transistor FET1. Accordingly, it is possible to prevent the battery voltage Vcc generated by the secondary battery 300 from being less than the operating limit of the integrated circuit in the secondary battery protection circuit 200.

Inasmuch as the falling of the battery voltage Vcc is limited to the threshold voltage Vth of the field effect transistor at the worst in the manner which is described above, it is possible to ensure an operating voltage of the secondary battery protection circuit 200 although the external connection terminals 101 and 102 are short-circuited and it is possible to prevent the secondary battery protection circuit 200 from being put into an inoperative state.

Figure 6:
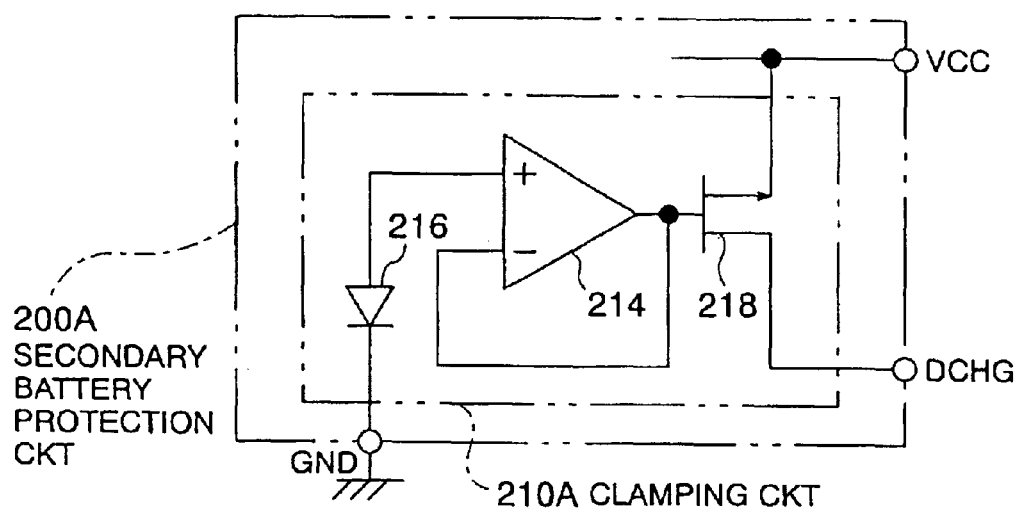
FIG. 6 is a block diagram of a main part of a secondary battery protection circuit according to a second embodiment of this invention.

Referring to FIG. 6, the description will proceed to a secondary battery protection circuit 200A according to a second embodiment of this invention. The illustrated secondary battery protection circuit 200A is similar in structure and operation to the secondary battery protection circuit 200 illustrated in FIG. 4 except that the clamping circuit is modified from that illustrated in FIG. 4 as will later become clear. The clamping circuit is therefore depicted at 210A.

The illustrated clamping circuit 210A is similar in structure and operation to the clamping circuit 210 illustrated in FIG. 4 except that the clamping circuit 210A comprises a P-channel field effect transistor (FET) 218 in lieu of the npn-type bipolar transistor 212 and further comprises a diode 216.

More specifically, the clamping circuit 210A is connected to the to the power source terminal VCC, the ground terminal GND, and the overdischarge detection output terminal DCHG. The clamping circuit 210A comprises the P-channel FET 218, the comparator 214, and the diode 216. The P-channel FET 218 has a source connected to the power source terminal VCC, a drain connected to the overdischarge detection output terminal DCHG, and a gate connected to the output terminal of the comparator 214. The comparator 214 has an inverting input terminal–connected to the output terminal of the comparator 214 (or the gate of the P-channel FET 218) and the noninverting input terminal+connected to the ground terminal GND through the diode 216. That is, the diode 216 has an anode connected to the noninverting input terminal+of the comparator 214 and a cathode connected to the ground terminal GND.

In the similar manner as the above-mentioned clamping circuit 210, the clamping circuit 210A also can prevent the gate potential of the first field effect transistor FET1 from falling in less than the ground potential when the external connection terminals 101 and 102 are short-circuited.

While this invention has thus far been described in conjunction with a few preferred embodiments thereof, it will now be readily possible for those skilled in the art to put this invention into various other manners.

What is claimed is:

1. A method of protecting a secondary battery by controlling, through selectively turning a discharge control switch on and off, a discharging current flowing from said secondary battery through a load connected between a pair of external connection terminals, said discharge control switch having a control terminal, said method comprising the step of:

clamping the control terminal of said discharge control switch to a ground potential when said external connection terminals are short-circuited.

2. A secondary battery protection circuit for protecting a secondary battery by controlling, through selectively turning a discharge control switch on and off, a discharging current flowing from said secondary battery through a load connected between a pair of external connection terminals, said discharge control switch having a control terminal, said secondary battery protection circuit comprising:

a clamping circuit for clamping the control terminal of said discharge control switch to a ground potential when said external connection terminals are short-circuited.

3. A secondary battery protection circuit as claimed in claim 2, said secondary battery protection circuit having a power source terminal, a ground terminal, and an overdischarge detection output terminal, said discharge control switch comprising a p-channel field effect transistor having a source connected to said power source terminal, a gate connected to said overdischarge detection output terminal as said control terminal, and a drain connected to one of said external connection terminals, wherein said clamping circuit is connected to said power source terminal, the overdischarge detection output terminal, and the ground terminal.

4. A secondary battery protection circuit as claimed in claim 3, wherein said clamping circuit comprises:

an npn-type bipolar transistor having a collector connected to said power source terminal, an emitter connected to said overdischarge detection output terminal, and a base; and a comparator having an output terminal connected to said base of said npn-type bipolar translator, an inverting input terminal connected to said overdischarge detection output terminal, and a noninverting input terminal connected to said ground terminal.

5. A secondary battery protection circuit as claimed in claim 3, wherein said clamping circuit comprises:

a P-channel field effect transistor haying a source connected to said power source terminal, a drain connected to said overdischarge detection output terminal, and a gate; and a comparator having an output terminal connected to said gate of said P-channel field effect transistor, an inverting input terminal connected to said gate of said P-channel field effect transistor, and a noninverting input terminal, and a diode having an anode connected to said noninverting input terminal of said comparator and a cathode connected to said ground terminal.

* * * * *